US012656766B2

(12) United States Patent
Scott et al.

(10) Patent No.: US 12,656,766 B2
(45) Date of Patent: Jun. 16, 2026

(54) MONITORING MANUFACTURING FLOWS ACROSS PRODUCT LIFECYCLE PHASES

(71) Applicant: The Boeing Company, Arlington, VA (US)

(72) Inventors: Matthew Lee Scott, Charleston, SC (US); James William Fonda, Rolla, MO (US); Geoffrey Nathaniel Greene, Chantilly, VA (US)

(73) Assignee: The Boeing Company, Arlington, VA (US)

( * ) Notice: Subject to any disclaimer, the term of this patent is extended or adjusted under 35 U.S.C. 154(b) by 377 days.

(21) Appl. No.: 18/461,208

(22) Filed: Sep. 5, 2023

(65) Prior Publication Data

US 2025/0076859 A1 Mar. 6, 2025

(51) Int. Cl.
G05B 19/41 (2006.01)
G05B 19/418 (2006.01)
G06F 18/213 (2023.01)

(52) U.S. Cl.
CPC .................. G05B 19/41865 (2013.01); G05B 2219/45054 (2013.01); G06F 18/213 (2023.01)

(58) Field of Classification Search
None
See application file for complete search history.

(56) References Cited

U.S. PATENT DOCUMENTS 8,050,986 B2 * 11/2011 Moeller ............. G06Q 10/0875
705/28
8,781,882 B1 * 7/2014 Arboletti ............ G06Q 10/0639
705/7.41

(Continued)

FOREIGN PATENT DOCUMENTS

CA 2531115 A1 * 6/2006 ............. G06F 30/20
CN 104063529 A * 9/2014 ....... G05B 19/41875

(Continued)

OTHER PUBLICATIONS

Pannequin et al., "The performance of product-driven manufacturing control: An emulation-based benchmarking study", Jan. 2009, Computers in Industry 60 (2009) 195-203. (Year: 2009).*

(Continued)

*Primary Examiner* — Mohammad Ali
*Assistant Examiner* — Kelvin Booker
(74) *Attorney, Agent, or Firm* — Alleman Hall LLP

(57) ABSTRACT

One example provides a method of monitoring a product moving through a manufacturing flow being performed across a plurality of product lifecycle phases. The method comprises obtaining, by computer network from a first device in a first product lifecycle phase, first object data related to a first process performed by a first device on the product, and obtaining, by the computer network from a second device in a second product lifecycle phase, second object data related to a second process performed by a second device on the product. The method further comprises determining product lifecycle data for the product based on the first object data and the second object data. The method further comprises storing the product lifecycle data for analyzing the manufacturing flow across the plurality of product lifecycle phases performed on the product.

17 Claims, 6 Drawing Sheets

OBJECT DATA 200

METADATA 201

IDENTIFIER 204

PROCESS DATA 202

(56)          References Cited

U.S. PATENT DOCUMENTS

| | | | | |
|---|---|---|---|---|
| 11,385,629 B2 * | 7/2022 | Ludwig | ............ | G05B 19/41875 |
| 2010/0262559 A1 * | 10/2010 | Wilcock | ............... | G06Q 10/067 |
| | | | | 705/348 |
| 2012/0150548 A1 * | 6/2012 | Rajagopalan | ........ | G06Q 10/067 |
| | | | | 705/1.1 |
| 2013/0304439 A1 * | 11/2013 | Van der Velden | ...... | G06F 30/20 |
| | | | | 703/6 |
| 2014/0108412 A1 * | 4/2014 | Masset | .................. | G06F 16/285 |
| | | | | 707/740 |
| 2018/0144277 A1 * | 5/2018 | Srivastava | ....... | G06Q 10/06315 |
| 2021/0089987 A1 * | 3/2021 | Mayer | ................... | G06Q 10/20 |
| 2021/0350294 A1 * | 11/2021 | Johnson | ................ | G06F 30/15 |
| 2022/0197247 A1 | 6/2022 | Cella et al. | | |
| 2022/0229424 A1 * | 7/2022 | Linder | ............ | G05B 19/41885 |
| 2022/0277119 A1 * | 9/2022 | Brucksch | ......... | G05B 19/41885 |
| 2023/0273588 A1 * | 8/2023 | Maturana | ............... | G06Q 10/00 |
| | | | | 700/97 |
| 2023/0274215 A1 * | 8/2023 | Maturana | .............. | G06F 40/123 |
| | | | | 705/343 |

FOREIGN PATENT DOCUMENTS

| | | | | | |
|---|---|---|---|---|---|
| CN | 104648879 A | * | 5/2015 | ....... | G06Q 10/06315 |
| CN | 104670775 A | * | 6/2015 | ....... | G06Q 10/06315 |
| CN | 105137928 A | * | 12/2015 | ....... | G05B 19/41875 |
| CN | 205931629 U | * | 2/2017 | ......... | G06Q 10/0875 |

| | | | | | |
|---|---|---|---|---|---|
| WO | WO-2016179455 A1 | * | 11/2016 | .......... | G06Q 10/063 |
| WO | 2019067471 A2 | | 4/2019 | | |

OTHER PUBLICATIONS

Zhang et al., "Modeling and simulation in intelligent manufacturing", Apr. 2019, Computers in Industry 112 (2019) 103123. (Year: 2019).*

Hibino et al., "Emulation in Manufacturing Engineering Processes", 2008, Proceedings of the 2008 Winter Simulation Conference. (Year: 2008).*

Liu et al., "Review of simulation-based life cycle assessment in manufacturing industry", Mar. 2019, Production & Manufacturing Research 2019, vol. 7, No. 1, 490-502. (Year: 2019).*

Gao et al., "An overview of manufacturing knowledge sharing in the product development process", Nov. 2017, Engineering Manufacture 2018, vol. 232(13) 2253-2263. (Year: 2017).*

Tao, F. et al., "Digital twin-driven product design, manufacturing and service with big data," The International Journal of Advanced Manufacturing Technology, vol. 94, Mar. 16, 2017, 14 pages.

European Patent Office, Extended European Search Report Issued in Application No. 241922939, Jan. 22, 2025, Germany, 10 pages.

Böttjer, T. et al., "A review of unit level digital twin applications in the manufacturing industry," CIRP Journal of Manufacturing Science and Technology, vol. 45, Jul. 3, 2023, 28 pages.

Cui, Z. et al., "A review of digital twin technology for electromechanical products: Evolution focus throughout key lifecycle phases," Journal of Manufacturing Systems, vol. 70, Aug. 7, 2023, 24 pages.

* cited by examiner

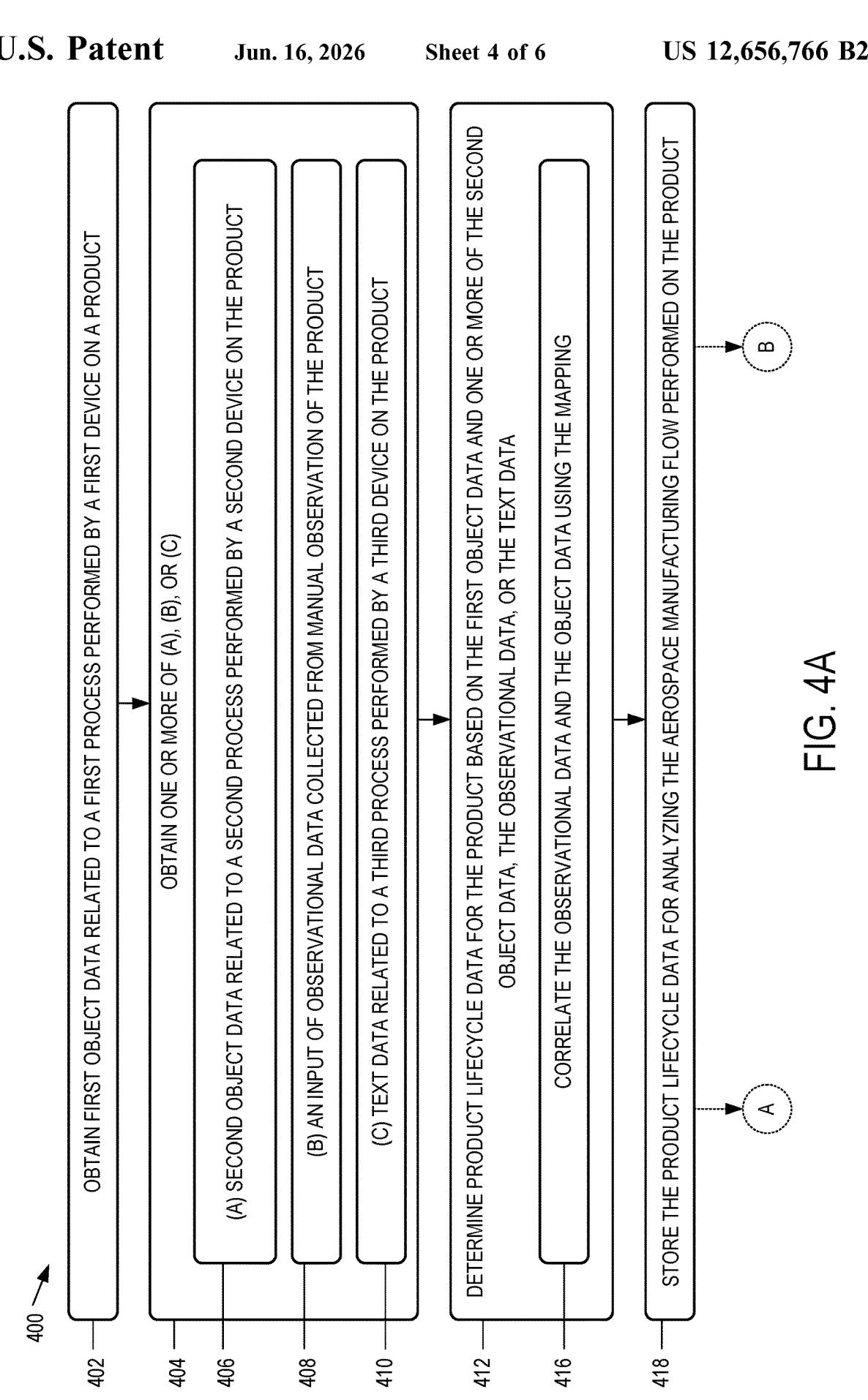

400

402 OBTAIN FIRST OBJECT DATA RELATED TO A FIRST PROCESS PERFORMED BY A FIRST DEVICE ON A PRODUCT

404 OBTAIN ONE OR MORE OF (A), (B), OR (C)

406 (A) SECOND OBJECT DATA RELATED TO A SECOND PROCESS PERFORMED BY A SECOND DEVICE ON THE PRODUCT 408 (B) AN INPUT OF OBSERVATIONAL DATA COLLECTED FROM MANUAL OBSERVATION OF THE PRODUCT 410 (C) TEXT DATA RELATED TO A THIRD PROCESS PERFORMED BY A THIRD DEVICE ON THE PRODUCT

412 DETERMINE PRODUCT LIFECYCLE DATA FOR THE PRODUCT BASED ON THE FIRST OBJECT DATA AND ONE OR MORE OF THE SECOND OBJECT DATA, THE OBSERVATIONAL DATA, OR THE TEXT DATA

416 CORRELATE THE OBSERVATIONAL DATA AND THE OBJECT DATA USING THE MAPPING

418 STORE THE PRODUCT LIFECYCLE DATA FOR ANALYZING THE AEROSPACE MANUFACTURING FLOW PERFORMED ON THE PRODUCT

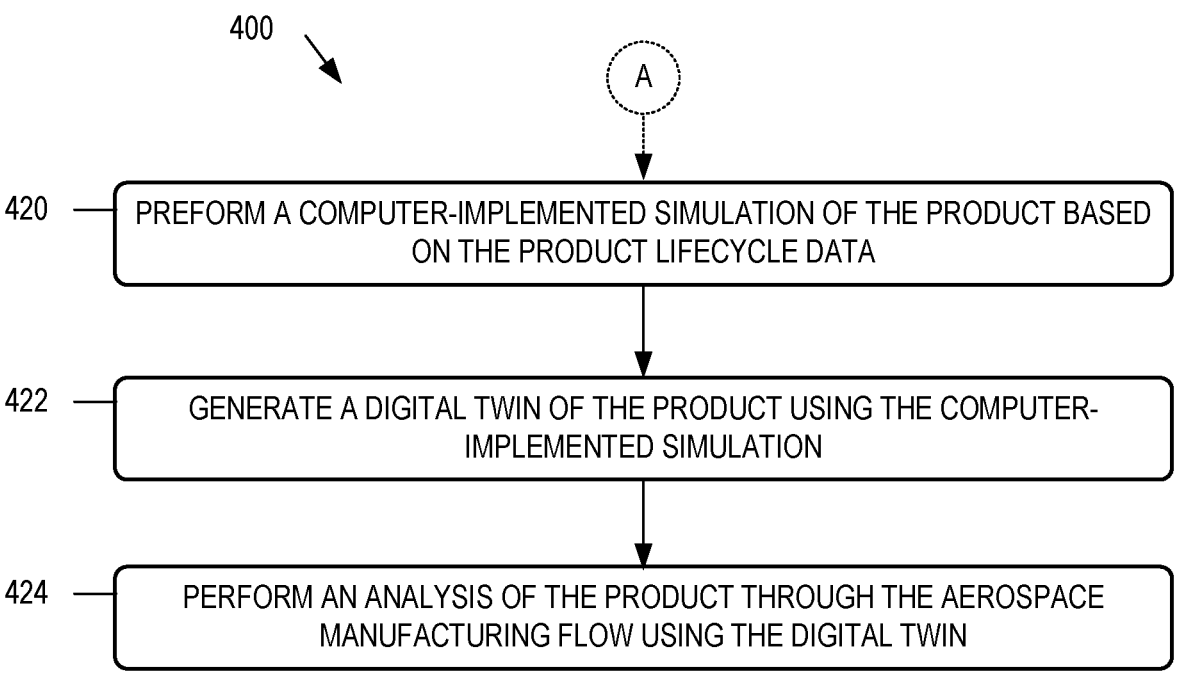

| 420 | PREFORM A COMPUTER-IMPLEMENTED SIMULATION OF THE PRODUCT BASED ON THE PRODUCT LIFECYCLE DATA |
| 422 | GENERATE A DIGITAL TWIN OF THE PRODUCT USING THE COMPUTER-IMPLEMENTED SIMULATION |
| 424 | PERFORM AN ANALYSIS OF THE PRODUCT THROUGH THE AEROSPACE MANUFACTURING FLOW USING THE DIGITAL TWIN |

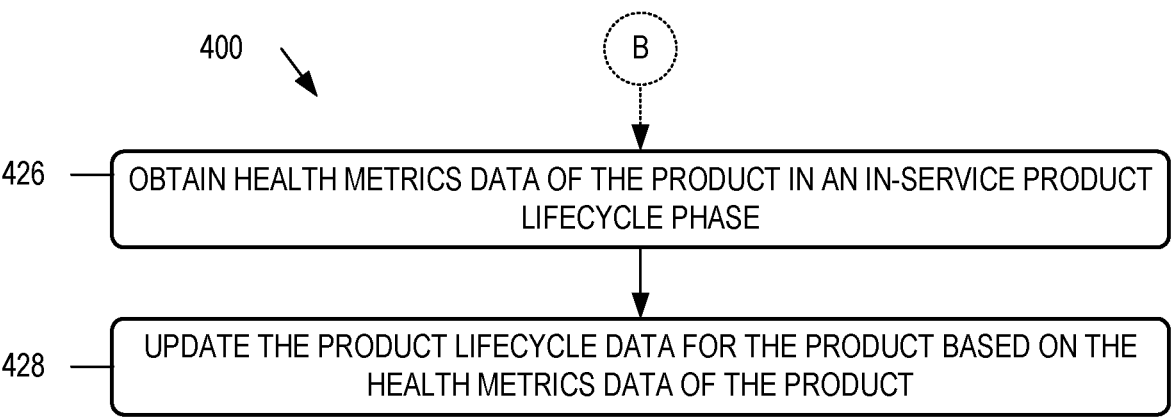

| 426 | OBTAIN HEALTH METRICS DATA OF THE PRODUCT IN AN IN-SERVICE PRODUCT LIFECYCLE PHASE |
| 428 | UPDATE THE PRODUCT LIFECYCLE DATA FOR THE PRODUCT BASED ON THE HEALTH METRICS DATA OF THE PRODUCT |

FIG. 4C

MONITORING MANUFACTURING FLOWS ACROSS PRODUCT LIFECYCLE PHASES

FIELD

The disclosed examples relate to data collection and correlation for a product moving through a manufacturing flow across a plurality of product lifecycle phases.

BACKGROUND

Aerospace manufacturing flows can utilize many different types of fabrication equipment to manufacture a part. For example, an additive manufacturing machine can be used to form a device, and later steps (e.g., machining, annealing, etc.) can be used to refine the additively manufactured part.

Machinery used in different fabrication processes can output data regarding a process cycle performed on a part. However, such data can be siloed, such that each machine is unaware of processes performed on a part by other machines used to make the part. Further, the data output for a particular part by different machines used to make the part can be manually entered for the part to build lifecycle data for the part. Manual entry can be time-consuming, and not practical for machines that generate large quantities of detailed data. In some manufacturing flows, historian software, hereinafter referred to as a historian, can be used to extract data for a part from some machines in the manufacturing lifecycle. However, such historians are generally configured for text data, and thus may not facilitate the integration of more complex data into lifecycle data for a part.

SUMMARY

One example provides a method of monitoring a product moving through a manufacturing flow being performed across a plurality of product lifecycle phases. The method comprises obtaining, by computer network from a first device in a first product lifecycle phase, first object data related a first process performed by the first device on the product, and obtaining, by the computer network from a second device in a second product lifecycle phase, second object data related to a second process performed by the second device on the product. The method further comprises determining product lifecycle data for the product based on the first object data and the second object data. The method further comprises storing the product lifecycle data for analyzing the manufacturing flow across the plurality of product lifecycle phases performed on the product.

Another example provides a computing system comprising a logic machine operably coupled to a first device in a first product lifecycle phase and to a second device in a second product lifecycle phase. The computing system further comprises a storage machine comprising instructions executable by the logic machine to obtain, by computer network from the first device, first object data related a first process performed by the first device on a product. The instructions are further executable to obtain, by the computer network from the second device, second object data related to a second process performed by the second device on the product, and determine product lifecycle data for the product based on the first object data and the second object data. The instructions are further executable to store the product lifecycle data for analyzing a manufacturing flow across a plurality of product lifecycle phases performed on the product.

Another example provides a method of monitoring a product moving through a manufacturing flow. The method comprises obtaining, by computer network from a device in a product lifecycle phase, object data related to a process performed by the device on the product. The object data comprises a first identifier. The method further comprises obtaining an input of observational data collected from manual observation of the product. The observational data comprises a second identifier. The method further comprises determining product lifecycle data for the product based on the object data, the observational data, and a mapping indicating a relationship between the first identifier and the second identifier. The method further comprises storing the product lifecycle data for analyzing the manufacturing flow across a plurality of product lifecycle phases performed on the product.

BRIEF DESCRIPTION OF THE DRAWINGS

FIGS. 4A-C illustrate a flowchart of an example method for monitoring a product moving through a manufacturing flow across product lifecycle phases.

DETAILED DESCRIPTION

Figure 1:
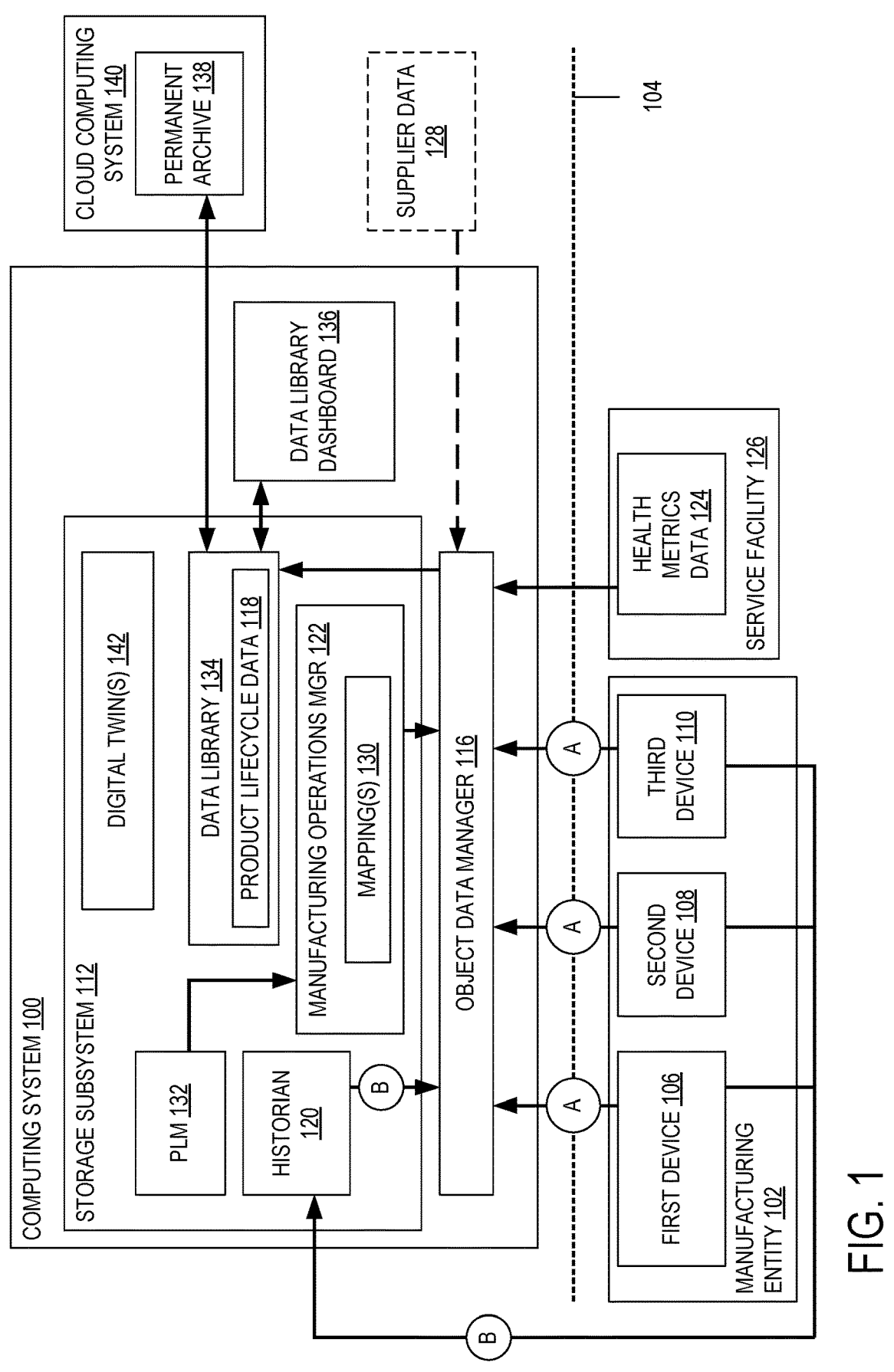
FIG. 1 schematically shows an example computing system for monitoring a product moving through a manufacturing flow.

As previously mentioned, current data extraction methods in aerospace manufacturing flows are done manually and can impede operation of advanced-manufacturing equipment. Current data extraction methods can include a human connecting a mobile storage device (e.g., universal serial bus (USB), external hard drive, solid-state drive, thumb drive, etc.) to a computing device, manually copying files from the mobile storage device to the computing device, and deleting the files from a source location. This manual data extraction method can cause device down-time while the procedure is performed, and is prone to human error. Further, the mobile storage device can also become lost, corrupt, or compromised, which can result in losing the data.

Some advanced fabrication equipment can generate large quantities of data. Some such data can be more complex than text data. Such data can also be referred to as object data. The term "object data" as used herein refers to data that is more complex than text data (e.g. text-based time series data). Examples include image data, hierarchical data format version 5 (HDF5 or H5), portable document format (PDF) data, word processor formatted data, and/or spreadsheet tabulated data. However, current data extraction methods can be impractical for consuming object data. For example, current data extraction methods can be configured to convert extracted data into text data for use with a historian. Converting object data to text data can result in lost data and/or add complexity to the software architecture. Further, data extraction methods using manual entry can be difficult with the large quantities of detailed data, as previously mentioned. Therefore, the object data from the advanced fabrication equipment is not properly contextualized and made easily available for analysis. This can reduce a value of the data generated by the advanced fabrication equipment.

Accordingly, the disclosed examples relate to data collection and correlation for a product moving through a manufacturing flow, where the data collection and correlation is performed across a plurality of product lifecycle phases. As discussed in more detail below, the disclosed examples obtain various data including object data, observational data, and/or text data from a plurality of corresponding devices. Object data comprises metadata and process data indicating one or more physical properties of a process performed on the product by a device. Observational data is collected from manual observation (e.g. of the product and/or the process), and is entered by a user. Text data comprises a series of data points. The disclosed examples determine product lifecycle data for the product based on the various data obtained, and store the product lifecycle data for analyzing the manufacturing flow performed on the product across the plurality of product lifecycle phases. In such a manner, the disclosed examples can help to achieve an end-to-end data capture, data organization, and delivery of the data for the production of a part across technology, network, and process barriers. Additionally, the disclosed examples help to enable carrying data from the device level up into the operational and business logic levels of a manufacturing organization.

Figure 2:
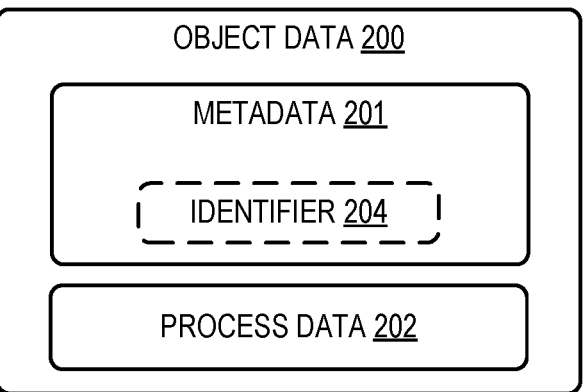
FIG. 2 schematically shows example object data utilized by the computing system of FIG. 1.

FIG. 1 shows a block diagram of an example computing system 100 configured to monitor a product in a manufacturing flow performed by a manufacturing entity 102. Manufacturing entity 102 can comprise one or more factories at one or more geographical locations. In some examples, the manufacturing flow can represent an aerospace manufacturing flow. In some such examples, the aerospace manufacturing flow comprises an additive aerospace manufacturing flow configured to form a part. The manufacturing flow can be configured to form a single part, a nest of various parts, or a unitized assembly from multiple parts. Computing system 100 is operatively coupled to manufacturing entity 102 using a factory isolation firewall 104 configured to provide network security. In the current example, manufacturing entity 102 comprises a first device 106 configured to perform a first process on the product, such as performing an additive manufacturing process, a welding process, an annealing process, a heat treatment process, a machining process, or a testing process, for example. First device 106 is further configured to generate object data. FIG. 2 schematically depicts example object data at 200. Object data 200 comprises a metadata 201 and process data 202. Process data 202 comprises data indictive of a process performed on a product being manufactured. Process data 202 can comprise data related to conditions of the process, and/or data related to the physical attributes of the product being processed. Examples of process data 202 include sensor information and reports, melt pool management (MPM) data, gridded data (e.g., images, video, etc.), optical tomography (e.g., near infrared imagery), computed tomography (CT), or 3D (three-dimensional) scan data. Metadata 201 includes an identifier 204. Examples of identifier 204 include one or more of temporal data (e.g., timestamp), a machine identity, a work-order number, and/or a job identity. In other examples, identifier 204 can be omitted.

In the disclosed examples, object data 200 has a larger file size than text data. In some examples, object data 200 can have a file size in the range of 40 bytes to 10 gigabytes. As a specific example, a Power Bed Fusion additive manufacturing process can generate a melt pool management file having a 5-megabyte binary file. Further, the welding process can generate additional melt pool files for different times and/or for different layers. Therefore, the welding process can generate object data 200 having a combined total file size on the order of 25 to 50 gigabytes. Object data 200 is illustrative and can have another configuration in other examples.

Returning to FIG. 1, first device 106 can alternatively or additionally be configured to generate first text data related to the first process. The text data can include time-series data in the form of a stream of data points. Example time-series data includes data such as temperature, oxygen content, a sensor state, and/or a machine state, for example. In some examples, the data stream can further indicate a corresponding time for each data point. In some examples the text data can comprise a comma separated value (CSV) file. In some examples, the text data can be configured to use the open platform communications unified architecture (OPC-UA) protocol or message queuing telemetry transport (MQTT) protocol.

Manufacturing entity 102 further comprises a second device 108 configured to perform a second process on the product in a similar manner as first device 106. The second process can comprise any suitable process including the examples disclosed above for the first process. Additionally, manufacturing entity 102 similarly comprises a third device 110 configured to perform a third process on the product. While depicted here with three devices, manufacturing entity 102 can comprise any suitable number of devices, such as one, two, or more than three devices in other examples.

As mentioned above, computing system 100 is configured to monitor the product moving through the manufacturing flow performed by manufacturing entity 102. As such, computing system 100 comprises a storage subsystem 112 and an object data manager 116. Object data manager 116 is configured to determine product lifecycle data 118 for the product based on various data obtained from a plurality of sources. Briefly, object data manager 116 extracts the various data, transforms the various data into a selected style, and loads (e.g., stores) the transformed data as product lifecycle data 118. Thus, object data manager 116 can help to correlate the various data for the product and store product lifecycle data 118 such that product lifecycle data 118 can be utilized for analyzing the manufacturing flow performed on the product. In some examples, object data manager 116 is configured to use APACHE NIFI, from The Apache Software Foundation, to perform the extraction, transformation, and loading (ETL) processes. Such a configuration can help to handle different types of data from various sources in an internet-of-things (IOT) oriented paradigm. Further aspects of storage subsystem 112 are discussed with reference to FIG. 5.

Object data manager 116 performs extraction of the various data from multiple data sources. Specifically, object data manager 116 is configured to obtain by computer network, at A, the first object data, the second object data, and the third object data from the corresponding first device 106, second device 108, and third device 110. Further, object data manager 116 is configured to also obtain by the computer network the first text data, the second text data, and the third text data from the corresponding plurality of first device 106, second device 108, and third device 110 utilizing a historian 120, as indicated by B. Historian 120 comprises a database type structure configured to consume time-series (temporal) text data, such as utilizing OPC-UA, for example. Such data is from sensors and logical controllers typically. In other examples, object data manager 116 can obtain a subset of the first object data, the second object data, the third object data, the first text data, the second text data, and the third text data.

Additionally, object data manager 116 is configured to obtain observational data using a manufacturing operations manager 122 by receiving an input of the observational data collected from manual observation of the product. The input of the observational data is manually entered by a user. As a specific example, an operator in manufacturing entity 102 performs a work-order for manual observation of the prod-uct and determines the observational data based on the manual observation. Further, the operator enters an input of the observational data, corresponding temporal information, and a corresponding work-order number into manufacturing operations manager 122. Examples of the observational data include a measured diameter, a measured height, another measured dimension of the product, and determined material properties of the product.

Object data manager 116 can be further configured to obtain health metrics data 124 from a service facility 126. Service facility 126 is configured to perform maintenance on the product (e.g., preventive maintenance, scheduled main-tenance, corrective maintenance, room temperature, room humidity, etc.) when the product is deployed in the field after production. Such maintenance can generate information in the form of health metrics data 124. Alternatively or addi-tionally, object data manager 116 can be further configured to obtain optional supplier data 128, such as materials data, pre-processing testing data, post-processing data, and/or testing result data from a fabricated product, for example. In other examples, object data manager 116 can be configured to obtain other suitable data related to the product. In further examples, health metrics data 124 and/or supplier data 128 can be omitted.

As discussed above, object data manager 116 obtains a set of product data for the product moving through the manu-facturing flow. Here, the set of product data comprises any suitable combination of the first object data, the second object data, the third object data, the first text data, the second text data, the third text data, the observational data, health metrics data 124, and/or supplier data 126. Further, one or more product data in the set of product data can comprise a data label (e.g., "serial number", "temperature", "time", etc.). The data label can vary in style depending on the source of the data, such styles as "serial number", "serial no", "machine identity", etc., for example. Thus, object data manager 116 is configured to transform the data label to a selected style such that the style of the data label is consis-tent across the set of product data. In some examples, object data manager 116 is further configured to transform recorded units in the set of product data into desired units, such as feet to meters, for example. Further, time information can be transformed into a selected time style, such as ISO 8601, for example. In such a manner, the data labels and/or the recorded units are transformed to be consistent across the set of product data. Further, object data manager 116 is config-ured to use a selected data label as an identifier to help correlate the set of product data. The identifier comprises one or more of temporal data, a machine identity, a job identity, and/or a work-order number. In various examples, the identifier can be generated at a source, by historian 120, and/or when obtained by object data manager 116.

In the current example, manufacturing operations man-ager 122 comprises one or more mappings 130. Each mapping 130 indicates a relationship between a pair of identifiers of a selected pair of product data in the set of product data. Manufacturing operations manager 122 is configured to determine mapping 130 utilizing knowledge of the manufacturing flow from a product lifecycle manager (PLM) 132. More specifically, PLM 132 comprises design data (e.g., computer-aided drafting (CAD) files). Further, the manufacturing operations manager 122 comprises plan data having metadata related to a corresponding process, such as start/stop times, a machine identity, and/or a job identity, for example. Additionally, the plan data can also have informa-tion indicating corresponding work-order numbers per-formed on the product. Manufacturing operations manager 122 can use the plan data to determine mapping 130 based on temporal correspondence, such as between a clock-in time of the observational data and one or more timestamps of the first object data. Manufacturing operations manager 122 alternatively or additionally can use the plan data to determine mapping 130 based on a work-order number to a job identify and/or a machine identity. In such a manner, manufacturing operations manager 122 provides one or more mappings 130 to object data manager.

Object data manager 116 is further configured to deter-mine product lifecycle data 118 based on the set of product data and also on one or more mappings 130. Therefore, object data manager 116 helps to correlate the various data (e.g., object data and text-based data) obtained for the product moving across the manufacturing flow. Addition-ally, object data manager 116 is also configured to store product lifecycle data 118 in a data library 134. Data library 134 is configured to provide product lifecycle data 118 to a data library dashboard 136 such that a user can interact with product lifecycle data 118. In various examples, data library dashboard 136 can be configured to perform data analysis, search, and/or another suitable operation on product life-cycle data 118. Data library 134 can store product lifecycle data 118 according to a machine event, such as a job identity, or in another suitable manner.

In the example of FIG. 1, computing system 100 is collocated with manufacturing entity 102. This can help to enable users at manufacturing entity 102 to have faster access to selected datasets of product lifecycle data 118 than accessing selected datasets of product lifecycle data from a remote data storage system. Additionally, data library 134 is configured to replicate product lifecycle data 118 to a permanent archive 138 on a cloud computing system 140. In some examples, cloud computing system 140 can further be operatively coupled with additional computing systems at other suitable factories. In some such examples, product lifecycle data 118 can be further replicated across the additional computing systems using permanent archive 138. Such a configuration can help to enable access to product lifecycle data 118 for a plurality of users distributed across different geographic locations and/or different time zones. Further, such configurations can help to enable the data access to be agnostic to various permission-controlled sys-tems. In other examples, cloud computing system 140 can have another configuration. In other examples, computing system 100 can be remote from manufacturing entity 102 and computer network-accessible (e.g., implemented as cloud-based services).

Storage subsystem 112 further comprises a digital twin 142 representing the product. Digital twin 142 is generated by performing a computer-implemented simulation based on product lifecycle data 118 for the product. Therefore, digital twin 142 can be used to analyze the product through the manufacturing flow, such as modeling a specified process performed in the manufacturing flow, for example. In some examples, additional digital twins 112 for the product can be generated, such as to represent the product at different phases in the manufacturing flow, for example.

As discussed above, computing system 100 can combine data collection of text data and object data across the manufacturing flow, and thus enables gathering target data sets and/or correlating the target data sets. The target data sets can be located in a cloud repository for geo-located data access for analysis by engineers and data scientists. Such analysis can help development of products and/or manufacturing flows. Computing system 100 can be configured, for example, as an enterprise cloud computing system, a heavy LINUX device running a virtual machine, a cluster of computing devices, an enterprise configuration at a data center, a combination thereof, or in any other suitable manner. FIG. 1 is illustrative. In other examples, computing system 100 and/or manufacturing entity 102 can have a different configuration. While discussed in context of a manufacturing flow, another manufacturing flow can use computing system 100 to monitor the manufacturing flow.

Some manufacturing entities utilize automation to help perform manufacturing flows. Such automation can be configured to utilize standards from the International Society of Automation (ISA), such as the ISA-95 standard for enterprise and control system integration, for example. The ISA-95 standard defines five levels of activities in a manufacturing organization, summarized as follows. Level 0 defines physical processes of a production process. Levels 1 and 2 sense and monitor the physical processes. Level 3 performs manufacturing operations management, such as maintenance functions, quality assurance and laboratory functions, and inventory movement functions, for example. Level 4 performs business planning and logistics. Therefore, the ISA-95 levels can help integration of various components across the manufacturing flow.

As discussed above, computing system 100 is configured to monitor a product moving through a manufacturing flow, such as an aerospace manufacturing flow. Further, the manufacturing flow is performed across a plurality of product lifecycle phases. Here, the plurality of product lifecycle phases include an engineering product lifecycle phase (e.g., design), a manufacturing product lifecycle phase, a post-processing and quality assurance (QA) product lifecycle phase, and an in-service product lifecycle phase (e.g., deployment in the field). In some examples, each of the plurality of product lifecycle phases can comprise one or more subphases.

Figure 3:
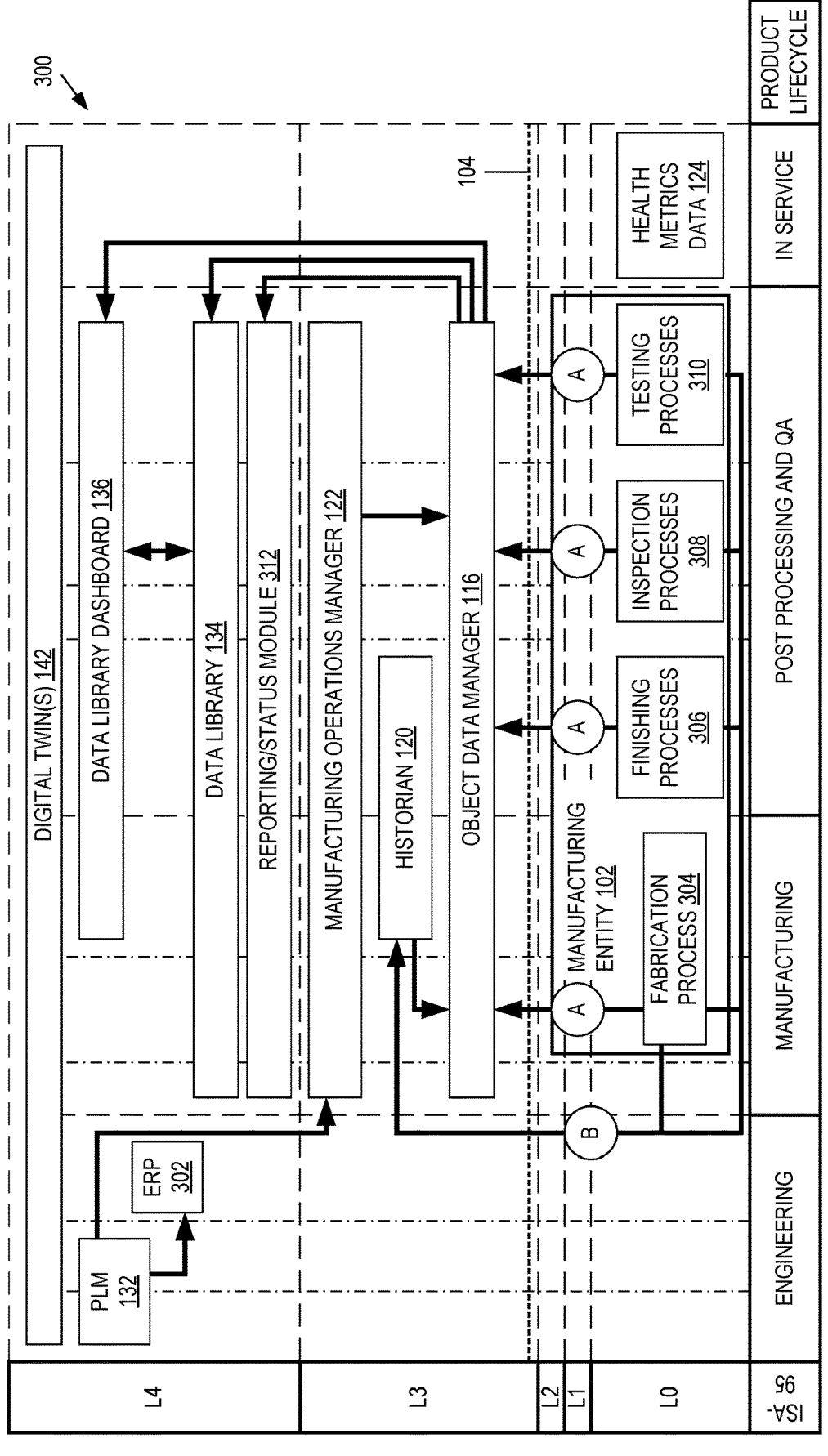
FIG. 3 schematically depicts an example communication architecture utilized by the computing system of FIG. 1.

A communication architecture can utilize ISA-95 levels and product lifecycle phases to help monitor a manufacturing flow. Thus, FIG. 3 schematically depicts an example communication architecture 300 with reference to the ISA-95 levels and the product lifecycle phases for a manufacturing flow. Here, communication architecture 300 is depicted using computing system 100 and manufacturing entity 102. Further, the depicted elements are placed in FIG. 3 such that the depicted location indicates a corresponding ISA-95 level and one or more corresponding product lifecycle phases in which the specified element is configured to be operative.

As previously mentioned, PLM 132 comprises design data related to the product and manufacturing operations manager (MOM) 122 comprises the plan data for the manufacturing flow. During the engineering product lifecycle phase, PLM 132 sends the design data or subset thereof to an enterprise resource planning (ERP) module 302. ERP module 302 is configured to monitor manufacturing resources, such as raw materials, manufacturing devices, or production capacity, for example. PLM 132 further sends the design data to manufacturing operations manager 122 for use during the manufacturing product lifecycle phase and the post-processing and QA product lifecycle phase.

In the depicted example, manufacturing entity 102 is configured to perform a plurality of processes including fabrication processes 304, finishing processes 306, inspection processes 308, and testing processes 310. The plurality of processes generates a set of object data and/or a set of text data (e.g., one or more of object data 200 and/or one or more of text data). Object data manager 116 obtains by the computer network, at A, the set of object data as previously discussed. Object data manager 116 also obtains by the computer network, indicated by B, the set of text data as previously discussed. Object data manager 116 determines product lifecycle data for the product based at least on the set of object data and the set of text data as previously discussed. In communication architecture 300, object data manager 116 sends monitoring information to a reporting/status module 312. The monitoring information can indicate a status or other reporting related to the product and/or the manufacturing flow using the product lifecycle data.

As an illustrative example, communication architecture 300 can be used to monitor a heat treatment process performed on a first product. The heat treatment process generates temperature text data comprising a data stream of temperature and a corresponding timestamp. Object data manager 116 obtains the temperature text data and translates the time information using ISO standards as previously discussed. Object data manager 116 determines first product lifecycle data for the first product based on the temperate text data and plan data from manufacturing operations manager 122. Additionally, digital twin 142 can be used to model the product being heated during the heat treatment process.

As another illustrative example, a second product can move through an additive manufacturing process, a heat treatment process, and a machining process. Using communication architecture 300, object data manager 116 utilizes manufacturing operations manager 122 and historian 120 to obtain various data for the second product and determine second product lifecycle data for the second product. Specifically, manufacturing operations manager 122 uses historian 120 to provide temporal information with respect to the additive manufacturing process, the heat treatment process, and the machining process to correlate the various data for the second product.

As previously mentioned, digital twins 142 can model the product at different product lifecycle phases. In such a manner, the one or more digital twins 142 can help to analyze various attributes of the product, such as materials and/or shapes, experiences during the manufacturing flow, and/or post-manufacturing experiences during servicing, for example. In some examples, the one or more digital twins 142 can also help to troubleshoot the product in the field and/or proactively provide feedback for process improvement. Additionally, communication architecture 300 can help to obtain additional data at the L3 level than current data extraction methods. Further, communication architecture 300 can help to enable a scalable system that consumes various data from a plurality of devices and across a plurality of product lifecycle phases. Communication architecture 300 is illustrative. In other examples, another communication architecture can be used.

FIGS. 4A-4C illustrate a flowchart of an example method 400 for monitoring a product moving through a manufacturing flow being performed across a plurality of product lifecycle phases. Method 400 can be performed by a computing system operative coupled to a factory, such as computing system 100, for example. In some examples, method 400 can utilize communication architecture 300. Method 400 comprises, at 402, obtaining, by computer network from a first device in a first product lifecycle phase, first object data related to a first process performed by the first device on the product. The first object data comprises process data indicative of one or more physical properties of the first process. The first object data can be object data 200, for example. The first device and the first process can be any suitable device and process, including the examples disclosed herein. At 404, method 400 comprises obtaining one or more of second object data, an input of observational data, or text data. The second object data is also obtained over the computer network. The second object data is related to a second process performed by a second device on the product, as indicated at 406. Further, the observational data is collected from manual observation of the product, as indicated at 408. In some examples, the input of observational data can be entered by an operator in a factory. The text data is related to a third process performed by a third device on the product, as indicated at 410, and is obtained over the computer network. In some examples, text data can be used. In various examples, the first object data and one or more of the second object data, the observational data, and the text data comprise an identifier. Examples of identifiers include temporal data, a machine identity, a job identity, or a work-order number.

Method 400 further comprises, at 412, determining product lifecycle data for the product based on the first object data and one or more of the second object data, the observational data, or the text data. In examples where the various data obtained utilizes identifiers, determining the product lifecycle data is further based on a mapping indicating a relationship between a pair of identifiers within the various data obtained. Specifically, determining the product lifecycle data comprises, at 416, correlating the observational data with the first object data using a mapping indicating a relationship between an identifier of the first object data and an identifier of the observational data. In some such examples, the mapping indicates a temporal correspondence between the identifier of the first object data and the identifier of the observational data. In other examples, the mapping can be determined based on one or more of temporal correspondence, a machine identity, a job identity, or a work-order number. In further examples, another mapping indicating a relationship between the pair of identifiers within the various data obtained can also be used to determine the product lifecycle data. In yet further examples, 416 can be omitted. Alternatively or additionally, in examples where the text data comprises an identifier, the text data can be correlated with object data and/or observational data in a similar manner.

Continuing, method 400 comprises, at 418, storing the product lifecycle data for analyzing the manufacturing flow across the plurality of product lifecycle phases performed on the product. The product lifecycle data can be accessible through a dashboard, such as data library dashboard 135, for example. This enables a user to search, retrieve, and/or report display a desired subset of the product lifecycle data. In some examples, analyzing the manufacturing flow can utilize a digital twin of the product. In such examples, method 400 moves to 420 in FIG. 4B, as indicated at A. Alternatively or additionally, the product lifecycle data can be updated using data obtained during an in-service product lifecycle phase. As such, method 400 moves to 426 in FIG. 4C, as indicated at B.

With reference to FIG. 4B, method 400 optionally comprises, at 420, performing a computer-implemented simulation of the product based on the product lifecycle data. Method 400 further comprises, at 422, generating a digital twin of the product using the computer-implemented simulation. In other examples, additional digital twins can also be generated for different product lifecycle phases. At 424, method 400 also comprises performing an analysis of the product through the manufacturing flow using the digital twin. In other examples, the additional digital twins can also be used for the analysis. Moving to FIG. 4C, method 400 comprises, at 426, obtaining health metrics data of the product in an in-service product lifecycle phase, such as obtaining health metrics data 124, for example. Method 400 also comprises, at 428, updating the product lifecycle data for the product based on the health metrics data. As previously mentioned, the updates to the product lifecycle data can also be accessed through the dashboard.

In such a manner, method 400 can be used to determine product lifecycle data of products moving through manufacturing flows over product lifecycle phases based on various data from a plurality of sources. The product lifecycle data can help to enable analysis of the manufacturing flow such as, for designing a next manufacturing flow or debugging performance of the product in the field. Further, the product lifecycle data can help to enable teaching artificial intelligence regarding the product and/or the manufacturing flow.

A computing system comprising an object data manager as disclosed herein can enable collection of various data, including object data, related to a product moving through a manufacturing flow across a plurality of product lifecycle phases. This can help to save costs in manual data management, device downtime prevention, data collection time, data discovery time, data retrieval time. Further, the computing system helps to enable traceability, pedigree, and/or data analytics throughout the product lifecycle phases.

In some examples the methods and processes described herein can be tied to a computing system of one or more computing devices. In particular, such methods and processes can be implemented in hardware as described above, as a computer-application program or service, an application-programming interface (API), a library, and/or other computer-program product.

Figure 5:
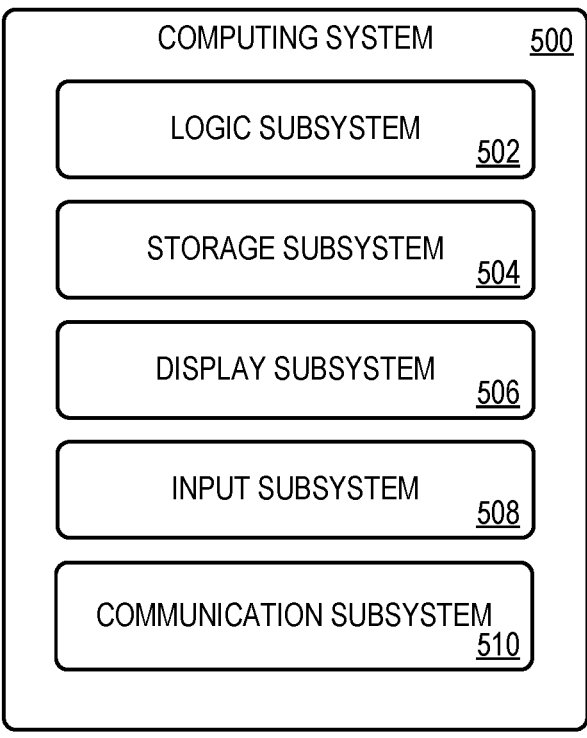
FIG. 5 shows a block diagram of an example computing system.

FIG. 5 schematically shows a simplified representation of a computing system 500 configured to provide any to all of the compute functionality described herein. Computing system 500 can take the form of one or more personal computers, server computers, and computers integrated with aircraft, as examples. Computing system 100 and cloud computing system 140 are examples of computing system 500.

Computing system 500 includes a logic subsystem 502 and a storage subsystem 504. Computing system 500 can optionally include a display subsystem 506, input subsystem 508, communication subsystem 510, and/or other subsystems not shown in FIG. 5.

Logic subsystem 502 includes one or more physical devices configured to execute instructions. For example, the logic subsystem can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic subsystem can include one or more hardware processors configured to execute software instructions. Additionally, or alternatively, the logic subsystem can include one or more hardware or firmware devices configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices can be collocated and/or remotely located. Storage subsystem 504 can include volatile, nonvolatile, dynamic, static, read/write, read-only, random-access, sequential-access, location-addressable, file-addressable, and/or content-addressable devices. Storage subsystem 504 can include removable and/or built-in devices. When the logic subsystem executes instructions, the state of storage subsystem 504 can be transformed—e.g., to hold different data.

Storage subsystem 504 can include removable and/or built-in devices. Storage subsystem 504 can include optical memory (e.g., CD, DVD, HD-DVD, Blu-Ray Disc, etc.), semiconductor memory (e.g., RAM, EPROM, EEPROM, etc.), and/or magnetic memory, among others. Storage subsystem 504 can include volatile, nonvolatile, dynamic, static, read/write, read-only, random-access, sequential-access, location-addressable, file-addressable, and/or content-addressable devices.

Aspects of logic subsystem 502 and storage subsystem 504 can be integrated together into one or more hardware-logic components. Such hardware-logic components can include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem can cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine can be instantiated by a single computing device, or a machine can include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality can optionally be saved as one or more unexecuted modules on one or more suitable storage devices.

When included, display subsystem 506 can be used to present a visual representation of data held by storage subsystem 504. This visual representation can take the form of a graphical user interface (GUI). As the herein described methods and processes change the data held by the storage subsystem, and thus transform the state of the storage subsystem, the state of display subsystem 506 can likewise be transformed to visually represent changes in the underlying data. Display subsystem 506 can include one or more display devices utilizing virtually any type of technology. Such display devices can be combined with the logic subsystem and the storage subsystem in a shared enclosure, or such display devices can be peripheral display devices.

When included, input subsystem 508 can comprise or interface with one or more input devices such as a keyboard and touch screen. In some examples, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; and an infrared, color, stereoscopic, and/or depth camera for machine vision and/or gesture recognition.

When included, communication subsystem 510 can be configured to communicatively couple computing system 500 with one or more other computing devices. Communication subsystem 510 can include wired and/or wireless communication devices compatible with one or more different communication protocols. As non-limiting examples, the communication subsystem can be configured for communication via a wireless telephone network, or a wired or wireless local- or wide-area network. In some examples, the communication subsystem may allow computing system 500 to send and/or receive messages to and/or from other devices via a network such as the Internet.

Further, the disclosure comprises configurations according to the following clauses.

Clause 1. A method of monitoring a product moving through a manufacturing flow being performed across a plurality of product lifecycle phases, the method comprising: obtaining, by computer network from a first device in a first product lifecycle phase, first object data related to a first process performed by the first device on the product; obtaining, by the computer network from a second device in a second product lifecycle phase, second object data related to a second process performed by the second device on the product; determining product lifecycle data for the product based on the first object data and the second object data; and storing the product lifecycle data for analyzing the manufacturing flow across the plurality of product lifecycle phases performed on the product.

Clause 2. The method of clause 1, further comprising obtaining an input of observational data collected from manual observation of the product, wherein the first object data comprises a first identifier and the observational data comprises a second identifier, and wherein determining the product lifecycle data for the product comprises correlating the observational data with the first object data using a mapping indicating a relationship between the first identifier and the second identifier.

Clause 3. The method of clause 2, wherein each of the first identifier and the second identifier comprises one or more of temporal data, a machine identity, a job identity, or a work-order number.

Clause 4. The method of clause 1, further comprising, performing a computer-implemented simulation of the product based on the product lifecycle data, generating a digital twin of the product using the computer-implemented simulation, and performing an analysis of the product through the manufacturing flow using the digital twin.

Clause 5. The method of clause 1, further comprising obtaining health metrics data of the product in an in-service product lifecycle phase of the plurality of product lifecycle phases, and wherein determining the product lifecycle data for the product comprises updating the product lifecycle data for the product based on the health metrics data of the product.

Clause 6. The method of clause 1, further comprising obtaining, over the computer network, text data related to a third process performed by a third device on the product, and wherein determining the product lifecycle data for the product is further based on the text data.

Clause 7. The method of clause 1, wherein the object data comprises metadata and process data indicative of one or more physical properties of the first process.

Clause 8. A computing system, comprising: a logic machine operably coupled to a first device in a first product lifecycle phase and to a second device in a second product lifecycle phase; and a storage machine comprising instructions executable by the logic machine to obtain, by computer network from the first device, first object data related to a first process performed by the first device on a product, obtain, by the computer network from the second device, second object data related to a second process performed by the second device on the product, determine product lifecycle data for the product based on the first object data and the second object data, and store the product lifecycle data for analyzing a manufacturing flow across a plurality of product lifecycle phases performed on the product.

Clause 9. The computing system of clause 8, wherein the instructions are further executable to obtain an input of observational data collected from manual observation of the product, wherein the first object data comprises a first identifier and the observational data comprises a second identifier, and wherein the instructions executable to determine the product lifecycle data for the product comprise instructions executable to correlate the observational data with the first object data using a mapping indicating a relationship between the first identifier and the second identifier.

Clause 10. The computing system of clause 9, wherein each of the first identifier and the second identifier comprises one or more of temporal data, a machine identity, a job identity, or a work order number.

Clause 11. The computing system of clause 8, wherein the instructions are further executable to perform a computer-implemented simulation of the product based on the product lifecycle data, generate a digital twin of the product using the computer-implemented simulation, and perform an analysis of the product through the manufacturing flow using the digital twin.

Clause 12. The computing system of clause 8, wherein the instructions are further executable to obtain health metrics data of the product in an in-service product lifecycle phase of the plurality of product lifecycle phases and wherein the instructions executable to determine the product lifecycle data for the product comprise instructions executable to update the product lifecycle data for the product based on the health metrics data of the product.

Clause 13. The computing system of clause 8, wherein the instructions are further executable to obtain, over the computer network, text data related to a third process performed by a third device on the product, and wherein the instructions executable to determine the product lifecycle data for the product comprise instructions executable to determine the product lifecycle data further based on the text data.

Clause 14. A method of monitoring a product moving through a manufacturing flow, the method comprising: obtaining, by the computer network from a device in a product lifecycle phase, object data related to a process performed by the device on the product, the object data comprising a first identifier; obtaining an input of observational data collected from manual observation of the product, the observational data comprises a second identifier; determining product lifecycle data for the product based on the object data, the observational data, and a mapping indicating a relationship between the first identifier and the second identifier; and storing the product lifecycle data for analyzing the manufacturing flow across a plurality of product lifecycle phases performed on the product.

Clause 15. The method of clause 14, wherein the mapping indicating the relationship between the first identifier and the second identifier is determined based on one or more of temporal correspondence, a machine identity, a job identity, or a work-order number.

Clause 16. The method of clause 14, wherein the device is a first device, the process is a first process, the method further comprises obtaining, by the computer network from a second device, second object data related to a second process performed by the second device on the product, and wherein determining the product lifecycle data for the product is further based on the second object data.

Clause 17. The method of clause 14, further comprising, performing a computer-implemented simulation of the product based on the product lifecycle data, generating a digital twin of the product using the computer-implemented simulation, and performing an analysis of the product through the manufacturing flow using the digital twin.

Clause 18. The method of clause 14, further comprising obtaining health metrics data of the product in an in-service product lifecycle phase of the plurality of product lifecycle phases, and wherein determining the product lifecycle data for the product comprises updating the product lifecycle data for the product based on the health metrics data of the product.

Clause 19. The method of clause 14, further comprising obtaining, over the computer network, text data related to a third process performed by a third device on the product, and wherein determining the product lifecycle data for the product is further based on the text data.

Clause 20. The method of clause 14, wherein the object data comprises metadata and process data indicative of one or more physical properties of the process.

The invention claimed is:

1. A method of monitoring a product moving through a manufacturing flow being performed across a plurality of product lifecycle phases, the method comprising:

obtaining, by computer network from a first device in a first product lifecycle phase, first object data related to a first process performed by the first device on the product;

obtaining, by the computer network from a second device in a second product lifecycle phase, second object data related to a second process performed by the second device on the product;

determining product lifecycle data for the product based on the first object data and the second object data;

storing the product lifecycle data for analyzing the manufacturing flow across the plurality of product lifecycle phases performed on the product;

performing a computer-implemented simulation of the product based on the product lifecycle data;

generating a digital twin of the product using the computer-implemented simulation; and performing an analysis of the product through the manufacturing flow using the digital twin.

2. The method of claim 1, further comprising obtaining an input of observational data collected from manual observation of the product, wherein the first object data comprises a first identifier and the observational data comprises a second identifier, and wherein determining the product life-cycle data for the product comprises correlating the observational data with the first object data using a mapping indicating a relationship between the first identifier and the second identifier.

3. The method of claim 2, wherein each of the first identifier and the second identifier comprises one or more of temporal data, a machine identity, a job identity, or a work-order number.

4. The method of claim 1, wherein the object data comprises metadata and process data indicative of one or more physical properties of the first process.

5. The method of claim 1, further comprising obtaining health metrics data of the product in an in-service product lifecycle phase of the plurality of product lifecycle phases, and wherein determining the product lifecycle data for the product comprises updating the product lifecycle data for the product based on the health metrics data of the product.

6. The method of claim 1, further comprising obtaining, over the computer network, text data related to a third process performed by a third device on the product, and wherein determining the product lifecycle data for the product is further based on the text data.

7. A computing system, comprising:

a logic machine operably coupled to a first device in a first product lifecycle phase and to a second device in a second product lifecycle phase; and a storage machine comprising instructions executable by the logic machine to obtain, by computer network from the first device, first object data related to a first process performed by the first device on a product, obtain, by the computer network from the second device, second object data related to a second process performed by the second device on the product, determine product lifecycle data for the product based on the first object data and the second object data, store the product lifecycle data for analyzing a manufacturing flow across a plurality of product lifecycle phases performed on the product, perform a computer-implemented simulation of the product based on the product lifecycle data, generate a digital twin of the product using the computer-implemented simulation, and perform an analysis of the product through the manufacturing flow using the digital twin.

8. The computing system of claim 7, wherein the instructions are further executable to obtain health metrics data of the product in an in-service product lifecycle phase of the plurality of product lifecycle phases and wherein the instructions executable to determine the product lifecycle data for the product comprise instructions executable to update the product lifecycle data for the product based on the health metrics data of the product.

9. The computing system of claim 7, wherein the instructions are further executable to obtain an input of observational data collected from manual observation of the product, wherein the first object data comprises a first identifier and the observational data comprises a second identifier, and wherein the instructions executable to determine the product lifecycle data for the product comprise instructions executable to correlate the observational data with the first object data using a mapping indicating a relationship between the first identifier and the second identifier.

10. The computing system of claim 9, wherein each of the first identifier and the second identifier comprises one or more of temporal data, a machine identity, a job identity, or a work order number.

11. The computing system of claim 7, wherein the instructions are further executable to obtain, over the computer network, text data related to a third process performed by a third device on the product, and wherein the instructions executable to determine the product lifecycle data for the product comprise instructions executable to determine the product lifecycle data further based on the text data.

12. A method of monitoring a product moving through a manufacturing flow, the method comprising:

obtaining, by a computer network from a device in a product lifecycle phase, object data related to a process performed by the device on the product, the object data comprising a first identifier;

obtaining an input of observational data collected from manual observation of the product, the observational data comprises a second identifier;

determining product lifecycle data for the product based on the object data, the observational data, and a mapping indicating a relationship between the first identifier and the second identifier;

storing the product lifecycle data for analyzing the manufacturing flow across a plurality of product lifecycle phases performed on the product;

performing a computer-implemented simulation of the product based on the product lifecycle data;

generating a digital twin of the product using the computer-implemented simulation; and performing an analysis of the product through the manufacturing flow using the digital twin.

13. The method of claim 12, further comprising obtaining health metrics data of the product in an in-service product lifecycle phase of the plurality of product lifecycle phases, and wherein determining the product lifecycle data for the product comprises updating the product lifecycle data for the product based on the health metrics data of the product.

14. The method of claim 12, further comprising obtaining, over the computer network, text data related to a third process performed by a third device on the product, and wherein determining the product lifecycle data for the product is further based on the text data.

15. The method of claim 12, wherein the mapping indicating the relationship between the first identifier and the second identifier is determined based on one or more of temporal correspondence, a machine identity, a job identity, or a work-order number.

16. The method of claim 12, wherein the device is a first device, the process is a first process, the method further comprises obtaining, by the computer network from a second device, second object data related to a second process performed by the second device on the product, and wherein determining the product lifecycle data for the product is further based on the second object data.

17. The method of claim 12, wherein the object data comprises metadata and process data indicative of one or more physical properties of the process.

* * * * *